2,938,888
Patented May 31, 1960

2,938,888

CHLOROPRENE COPOLYMERS

Elizabeth S. Lo, Elizabeth, N.J., assignor, by mesne assignments, to Minnesota Mining and Manufacturing Company, St. Paul, Minn., a corporation of Delaware No Drawing. Filed Mar. 30, 1956, Ser. No. 574,965

2 Claims. (Cl. 260—87.5)

This invention relates to halogen-containing polymeric compositions. In one aspect, the invention relates to polymeric chloroprene compositions. More particularly in this aspect, the invention relates to elastomeric polymeric chloroprene compositions and the method for their manufacture. The use of chloroprene

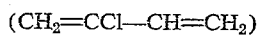
$$(CH_2=CCl-CH=CH_2)$$

as thermoplastic elastomeric compositions, is well-known. These materials can be fabricated into a wide variety of useful articles for many commercial applications. In practical uses, however, it is found that polychloroprene, upon aging, undergoes discoloration and deterioration, so that an ultimate break-down of the article fabricated from this polymeric material takes place. Although polychloroprene possesses useful properties, such as elasticity and extensibility, and is easily fabricated into useful articles, nevertheless, because of the foregoing deleterious aging characteristics, the use of this polymeric material is limited in commercial application.

It is, therefore, an object of this invention to provide new and useful polymeric chloroprene compositions having desirable and chemical characteristics.

Another object of the invention is to provide new and useful polymeric chloroprene compositions, possessing elastomeric properties, together with good chemical and physical characteristics, and which can be easily fabricated into a wide variety of useful articles of improved chemical and physical stability.

Still another object of this invention is to provide new and useful polymeric chloroprene compositions, serving as protective coatings, which have the aforementioned characteristics, and which can be readily applied to the surfaces of a wide variety of useful articles.

Still another object of the invention resides in a process for obtaining these polymeric compositions in good yields.

Various other objects and advantages inherent in the invention will become apparent to those skilled in the art from the accompanying description and disclosure.

It has now been found that the copolymerization of chloroprene and a 1,3-butadiene, such as fluoroprene $(CH_2=CF-CH=CH_2)$, 1,1,2-trifluorobutadiene

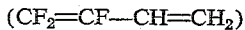
$$(CF_2=CF-CH=CH_2)$$

or 1,1,3 - trifluorobutadiene $(CF_2=CH-CF=CH_2)$, under the conditions more fully hereinafter described, produces an improved chloroprene composition which does not discolor or deteriorate upon long-aging, possesses improved chemical and physical stability and increased resistance to oils, fuels and various other strong chemical reagents, which are not to be found in polychloroprene itself. These polymeric products of chloroprene with either fluoroprene or 1,1,2-trifluorobutadiene or 1,1,3-trifluorobutadiene, constitute valuable macromolecules and are adaptable to a wide variety of commercial uses. They possess low temperature flexibility in addition to the aforementioned properties of chemical and physical stability and resistance to oil and hydrocarbon fuels. They are also selectively soluble in various commercial solvents and serve as durable, flexible protective coatings on surfaces which are subjected to environmental conditions in which they may come into contact with any of the aforementioned corrosive substances.

In general, as more fully hereinafter disclosed, the polymeric compositions of the present invention are produced from the polymerization of monomeric mixtures containing chloroprene with any of the aforementioned 1,3-butadienes (e.g., fluoroprene, 1,1,2-trifluorobutadiene or 1,1,3-trifluorobutadiene) as a comonomer, at temperatures between about −25° C. and about 150° C., with intermediate temperature ranges being selected with reference to the specific polymerization system employed. The most useful polymeric compositions of the present invention are copolymers containing between about 10 mole percent and about 75 mole percent chloroprene and the remaining major constituent being any of the aforementioned 1,3-butadienes. The preferred copolymeric compositions of the present invention are copolymers containing between about 25 mole percent and about 75 mole percent chloroprene, and the remaining major constituent being any of the aforementioned 1,3-butadiene comonomers. In order to produce the aforementioned copolymeric compositions containing between about 10 mole percent and about 75 mole percent chloroprene, it is found that the monomeric feed comprises between about 5 mole percent and about 60 mole percent chloroprene and the remaining major constituent being any of the aforementioned 1,3-butadienes as a comonomer. In order to produce the preferred polymeric compositions containing between about 25 mole percent and about 75 mole percent chloroprene, it is found that the monomeric feed comprises between about 10 mole percent and about 60 mole percent chloroprene and the remaining major constituent being any of the aforementioned 1,3-butadienes as a comonomer.

The elastomeric polymeric compositions of the present invention are preferably prepared by carrying out the polymerization reaction in the presence of a free radical-forming promoter. For this purpose, the polymerization reaction is carried out by employing a water-soluble peroxy type initiator in a water-suspension type recipe or an organic peroxide initiator in a bulk-type system. The water-suspension type recipe is preferred.

The water-suspension type system contains a water-soluble peroxy-type initiator, which is preferably present in the form of an inorganic persulfate such as potassium persulfate, sodium persulfate or ammonium persulfate. In addition, the water-suspension type recipe system may also contain, in some instances, a variable-valence metal salt, for example, an iron salt such as ferrous sulfate or ferrous nitrate to accelerate the copolymerization reaction. The water-soluble initiator present in the water-suspension type recipe system comprises between about 0.1 and about 5 parts by weight per 100 parts of total monomers present. The variable-valence metal salt is preferably employed in an amount between about 0.01 and about 0.2 part by weight per 100 parts of total monomers present. It is also desirable, in some instances, in these water-suspension type recipe systems, that a reductant be present, preferably in the form of a bisulfite, such as sodium bisulfite, potassium bisulfite, sodium metabisulfite or potassium metabisulfite. The reductant comprises between about 0.05 and about 5 parts by weight per 100 parts of total monomers present; preferably the reductant comprises between about 0.1 and about 2 parts by weight per 100 parts of total monomers present.

In these water-suspension type recipe systems, it is desirable to employ an emulsifying agent. This emulsifying agent is present either in the form of an aliphatic metal acid-salt having from 14 to 20 carbon atoms per molecule, or in the form of a halogenated-organic acid or salts thereof, having from 6 to 18 carbon atoms per molecule. A typical example of the former is potassium stearate. Typical examples of the halogenated-organic acid or salts thereof, serving as emulsifying agents in the above-mentioned water-suspension type recipe systems, are polyfluorocarboxylic acids (e.g., perfluorooctanoic acid) or perfluorochlorocarboxylic acid salts (e.g., trifluorochloroethylene telomer acid soaps). The polyfluorocarboxylic acids which may be employed are such as those disclosed in U.S. Patent No. 2,559,752; and the non-acidic derivatives of the acids disclosed therein as being effective dispersing agents may also be used in the process of the present invention. The perfluorochlorocarboxylic acid salts which may be used in accordance with this invention are those disclosed in co-pending application Serial No. 501,782, filed April 18, 1955, as being useful dispersing agents in polymerization reactions. In general, these emulsifying agents are present in an amount between about 0.5 and about 10 parts by weight per 100 parts of total monomers present.

The polymerization reaction is preferably conducted under alkaline conditions. It is desirable, therefore, that the pH be maintained between about 7 and 11 in order to prevent gelling of the resulting polymeric product, a condition which often causes slow-down or stoppage of the polymerization reaction. In this respect, it should be noted that it is sometimes necessary to maintain the pH of the system within the aforementioned pH limits by the addition of suitable buffer agents. Typical examples of these buffer agents are sodium borate and disodium phosphate.

As indicated above, the polymerization reaction may also be carried out with the initiator being present in the form of an organic peroxide in a bulk-type polymerization system. Of these organic peroxide promoters, halogen-substituted peroxides are most desirable. A prepreferred promoter of this type is trichloroacetyl peroxide. Other halogen-substituted organic peroxides for carrying out the polymerization reaction are trifluorodichloropropionyl peroxide, trifluoroacetyl peroxide, difluoroacetyl peroxide, chloroacetyl peroxide, 2,4-dichlorobenzoyl peroxide and dichlorofluoroacetyl peroxide.

As previously indicated, the polymerization reaction is carried out, in general, at a temperature between about —25° C. and about 150° C. When the polymerization reaction is carried out employing a water-suspension type recipe, temperatures between about 15° C. and about 75° C. are preferably employed. When the polymerization reaction is carried out in the presence of an organic peroxide initiator in a bulk-type polymerization system, temperatures over the entire range of between about —25° C. and about 150° C. are preferably employed depending upon the decomposition temperature of the promoter. The polymerization reactions described herein to produce the polymeric compositions of the present invention are carried out under autogenous conditions of pressure. These pressures may vary from about atmospheric pressure to as high as 2000 pounds per square inch. However, in general, these pressures do not rise above approximately 500 pounds per square inch.

As previously indicated, the polymeric compositions of the present invention are particularly useful and suitable when employed in the form of durable, flexible coatings on a wide variety of surfaces, and particularly on surfaces which are subjected to distortion in normal use, such as fabric surfaces. For this purpose, the polymeric composition may be dissolved in various commercial solvents. Particularly useful solvents comprise the aliphatic and aromatic esters, ketones and halogenated hydrocarbons. Typical examples of these solvents are di-isobutyl ketone, methyl ethyl ketone, methyl isobutyl ketone, ethyl acetate and 1,1,2-trifluorotrichloroethane. In this respect, it should be noted that it is often desirable to regulate the molecular weight of the polymeric compositions of the present invention in order to obtain greater solubility in organic solvents. It is found that the addition of various polymerization modifiers appreciably reduces the molecular weight of the polymeric compositions and increases their solubility, without affecting unduly, the overall yield. Suitable polymerization modifiers include chloroform ($CHCl_3$), Freon–113 ($CF_2ClCFCl_2$), carbon tetrachloride ($CCl_4$), trichloroacetyl chloride ($CCl_3COCl$), bromotrichloroethane ($CBrCl_3$), dodecyl mercaptan, $C_{12}H_{25}SH$) and mixed tertiary mercaptans. These modifiers are preferably added in amounts between about 0.01 and about 10 parts by weight per 100 parts of total monomers charged to the polymerization reaction. Chloroform is preferred.

The following examples are offered for a better understanding in producing the copolymeric compositions of the present invention and are not be construed as limiting its scope.

Example I

A heavy-walled glass polymerization tube of about 20 ml. capacity was flushed with nitrogen and then charged with 5 cc. of a soap solution, prepared by dissolving 5 grams of potassium stearate in 100 ml. of water. The contents of the tube were then frozen, and the tube was then charged with 1 ml. of a solution prepared by dissolving 0.4 gram of sodium metabisulfite in 20 ml. of water. The contents of the tube were then refrozen, and thereafter 4 cc. of a solution prepared by dissolving 0.75 gram of potassium persulfate in 80 ml. of water, were added. The contents of the tube were again frozen, and the tube was then connected to a gas-transfer system and evacuated at liquid nitrogen temperature. To the frozen contents of the tube were added, by distillation, 2.76 grams of chloroprene and 2.24 grams of fluoroprene, which comprised a 50/50 molar ratio.

The polymerization tube was then sealed under vacuum and agitated in a temperature-regulated water-bath at 50° C. for a period of 24 hours. At the end of this time, the contents of the tube were coagulated by freezing at liquid nitrogen temperature. The resultant coagulated product was then removed from the tube, washed with hot water, and dried to constant weight in vacuo at 35° C. A copolymeric elastomeric product was obtained which was found, upon analysis, to comprise 73 mole percent chloroprene and the remaining major constituent fluoroprene, being present in an amount of approximately 27 mole percent. The copolymer was obtained in an amount corresponding to a 74% conversion.

Example II

Employing the procedure set forth in Example I and the same polymerization system, the tube was charged with 2.25 grams of chloroprene and 2.75 grams of 1,1,2-trifluorobutadiene, which comprised a 50/50 molar ratio.

The 1,1,2-trifluorobutadiene monomer was obtained by adding dibromofluoromethane to 1-fluoropropene to produce the adduct $CF_2BrCHFCHBrCH_3$, which, upon dehydrobromination, yielded $CF_2=CFCHCH_2$, B.P. 4.8° C.–8.0° C. 1-fluoropropene was prepared by the following series of reactions:

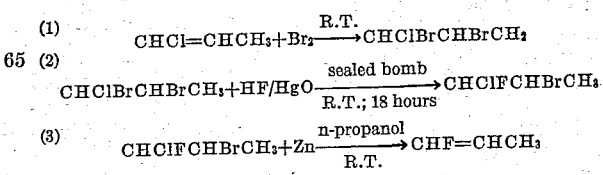

The polymerization reaction was carried out at a temperature of 50° C. for a period of 24 hours. The resultant elastomeric product was worked-up in accordance with the same procedure as set forth in Example I. A rubbery copolymeric product was obtained and, upon analysis, was found to comprise approximately 59 mole percent chloroprene, and the remaining major constituent 1,1,2-trifluorobutadiene, being present in an amount of approximately 41 mole percent. The copolymer was obtained in an amount corresponding to an 83% conversion.

A sample of the raw copolymer was compression molded at 250° F. for a period of 10 minutes. After molding, the sample retained its rubbery characteristics. A volume increase of 80.6% was observed in the molded sample, when tested by ASTM designation, D–471–49T, in ASTM type II fuel, consisting of isooctane (60% by volume), benzene (5% by volume), toluene (20% by volume) and xylene (15% by volume). Gehman stiffness of the molded sample of raw copolymer determined according to ASTM designation, D–1053–49T, was as follows:

$T_2 = +7.5°C.; T_5 = -7.3°C.;$
$T_{10} = -11°C.; T_{100} = -21.7°C.$

*Example III*

Employing the procedure set forth in Example I and the same polymerization system, the tube was charged with 2.25 grams of chloroprene and 2.75 grams of 1,1,3-trifluorobutadiene, which comprised a 50/50 molar ratio.

The 1,1,3-trifluorobutadiene monomer was obtained by adding dibromodifluoromethane to 2-fluoropropene to produce the adduct, $CF_2BrCH_2CFBrCH_3$, which was then dehydrobrominated at about 150° C. using tri-n-butyl amine to yield $CF_2=CH-CF=CH_2$, B.P. 17.5° C.–19.4° C. 2-fluoropropene was prepared by the following series of reactions:

(1) $CH_3ClCHClCH_3 + KOH \longrightarrow CH_2=CClCH_3 + CHCl=CHCH_3$ (2) $CH_2=CClCH_3 + HF \longrightarrow CH_3CFClCH_3$ (3) 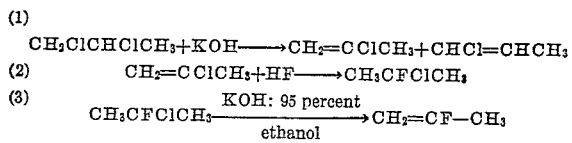

The polymerization reaction was carried out at a temperature of 50° C. for a period of 24 hours. The resultant elastomeric product was worked-up in accordance with the same procedure as set forth in Example I. A rubbery product was obtained and, upon analysis, was found to comprise approximately 61 mole percent chloroprene, and the remaining major constitute 1,1,3-trifluorobutadiene, being present in an amount of approximately 39 mole percent. The copolymer was obtained in an amount corresponding to an 84% conversion.

As previously indicated, the polymeric compositions of the present invention posses highly desirable physical and chemical properties which make them useful for the fabrication of a wide variety of thermoplastic articles, or for the application to various surfaces as protective coatings. In such uses, a raw elastomeric copolymer, such as is produced in accordance with the procedure set forth in the above examples, is extruded or pressed into sheets at temperatures between about 250° F. and about 400° F. and at a pressure between about 500 and about 15,000 pounds per square inch for a period of about 5 to about 60 minutes. Thereafter, various articles can be molded from preforms cut from sheets and extruded stock in the form of gaskets, diaphragms, packings, etc. In this respect, it is preferred in such applications, that the raw copolymer also include various vulcanizing agents and fillers.

When employed as protective coatings on any of the surfaces previously described, the raw copolymeric composition is dissolved in any of the aforementioned solvents and is applied to the desired surfaces, employing such apparatus as a knife-spreader or a doctor-blade or a reverse-roll coater. The solvent, after the copolymeric coating composition has been applied to the surface, is permitted to evaporate. This may also be accomplished in the presence of elevated temperatures, if so desired. In many applications, it is desirable to include in the copolymeric coating composition, various vulcanizing agents. In the latter case, supplementary heat treatment of the coating is required, either during the solvent-removal step or thereafter. After the solvent has been completely evaporated, the coated surface is ready for use. In this respect, it should be noted that the polymeric coating composition may be applied to the surface either as a single coating or, if so desired, the protective coating may be built-up by the application of several layers, each layer being permitted to harden by solvent evaporation before the next layer is applied. Furthermore, if so desired, the protective coatings, or the polymeric composition, when obtained in the form of sheets, may be suitably pigmented.

Other uses for the polymeric compositions of the present invention reside in the fabrication of belting, hose, mountings, piston and pump valves, sheet and valve-disks, rolls, tubing, pressure-sensitive tape for electrical insulation purposes, grommets, or as adhesives for fastening a rubber surface to a metal or another rubber surface.

Since certain changes may be made in carrying out the process of the present invention in producing the desired polymeric compositions without departing from the scope of the invention, it is intended that all matter contained in the above description is to be interpreted as illustrative and not in a limiting sense.

I claim:

1. An elastomeric copolymer capable of being extruded and pressed into sheets at temperatures between about 250° F. and about 400° F. at pressures between about 500 and about 15,000 pounds per square inch for a period of about 5 to about 60 minutes which consists essentially of monomer units corresponding to between about 25 and about 75 mole percent chloroprene and between about 75 and about 25 mole percent 1,1,3-trifluorobutadiene.

2. A process which comprises polymerizing between about 10 and about 60 mole percent chloroprene with between about 90 and about 40 mole percent 1,1,3-trifluorobutadiene at a temperature between about 15° C. and about 75° C. in the presence of a free radical forming polymerization promoter.

References Cited in the file of this patent

UNITED STATES PATENTS

| | | |
|---|---|---|
| 2,029,410 | Carothers et al. | Feb. 4, 1936 |
| 2,366,326 | Fryling | Jan. 2, 1945 |
| 2,414,769 | Rust et al. | Jan. 21, 1947 |
| 2,446,382 | Mochel | Aug. 3, 1948 |
| 2,514,195 | Kuhn | July 4, 1950 |
| 2,750,431 | Tarrant et al. | June 12, 1956 |

OTHER REFERENCES

Mochel et al.: Ind. Eng. Chem., vol. 40, pp. 2285–9 (1948).